United States Patent
Cheaito et al.

(10) Patent No.: US 6,928,154 B1
(45) Date of Patent: Aug. 9, 2005

(54) REMOTE CALLER IDENTIFICATION TELEPHONE SYSTEM AND METHOD WITH INTERNET RETRIEVAL

(75) Inventors: Ramzi Cheaito, Ottawa (CA); Ghassan Osman, Stittsville (CA); Marwan Osman, Stittsville (CA)

(73) Assignee: Nortel Networks Limited, Research Triangle Park, NC (US)

( * ) Notice: Subject to any disclaimer, the term of this patent is extended or adjusted under 35 U.S.C. 154(b) by 0 days.

(21) Appl. No.: 09/258,407

(22) Filed: Feb. 26, 1999

(51) Int. Cl.[7] .............................................. H04M 3/42
(52) U.S. Cl. ........................ 379/207.15; 375/142.04; 375/142.06; 375/88.17; 375/88.2; 375/88.21; 370/352
(58) Field of Search ................... 379/67.1, 68, 88.17, 379/88.18, 88.19, 88.2, 88.21, 118, 142.04, 142.06, 142.13, 207.15, 142.08, 88.25

(56) References Cited

U.S. PATENT DOCUMENTS

| | | | | | |
|---|---|---|---|---|---|
| 4,930,152 | A | * | 5/1990 | Miller | 379/214.01 |
| 5,568,540 | A | * | 10/1996 | Greco et al. | 123/559.1 |
| 5,898,770 | A | * | 4/1999 | Valentine | 379/249 |
| 5,943,409 | A | * | 8/1999 | Malik | 379/209.01 |
| 5,946,386 | A | * | 8/1999 | Rogers et al. | 379/265.09 |
| 6,282,269 | B1 | * | 8/2001 | Bowater et al. | 379/88.17 |
| 6,282,275 | B1 | * | 8/2001 | Gurbani et al. | 379/142.06 |
| 6,370,542 | B1 | * | 4/2002 | Kenyon | 707/6 |

* cited by examiner

*Primary Examiner*—Fan Tsang
*Assistant Examiner*—Simon P. Sing
(74) *Attorney, Agent, or Firm*—Foley & Lardner LLP (57) ABSTRACT

A remote caller identification system with data logging and retrieval features including a data logging unit which logs caller identifying information from incoming calls from a caller to a subscriber phone connected to a switched telephone network. A subscriber may subsequently retrieve the caller identifying information from the data logging unit via a remote phone or via the internet. The system has at least three possible implementations. In one implementation, the caller identifying information is stored in a Service Signaling Point database. In a second implementation, the caller identifying information is stored in a Service Control Point database. In the third implementation, the caller identifying information is stored in a database in a storage and retrieval device of a stand alone Customer Premises Equipment. A caller retrieving the caller identification information is prompted to input a password and with a menu to review or edit the caller identifying information.

37 Claims, 6 Drawing Sheets

REMOTE CALLER IDENTIFICATION TELEPHONE SYSTEM AND METHOD WITH INTERNET RETRIEVAL

RELATED APPLICATIONS

This application is related to application entitled "REMOTE CALLER IDENTIFICATION TELEPHONE SYSTEM AND METHOD", Ser. No. 09/258,405, filed Feb. 26, 1999.

BACKGROUND OF THE INVENTION

This invention relates to a telephone system and method which allows a subscriber to remotely identify calls to the subscriber's phones.

The ability to remotely identify phone calls placed to one's home or business is of increasing importance for allowing people the mobility to work from both home and business, and to travel while still keeping in touch with callers to home or business. Currently a phone user can remotely identify calls to his phone if the phone user subscribes to a voice mail system (VMS) service and has a voice mail account. If callers have called and left voice mail messages, the user may listen to these messages by placing a call to the voice mail service and then accessing the messages. Typically, the phone user accesses messages by listening to prompting messages, and then choosing options such as an option to play a message or delete a message. The phone user typically would input his choice of options using the keypad of a touch tone phone.

However, if the caller hangs up before leaving a voice mail message, the phone user will not be able to identify that caller. Often a caller is unwilling to wait until the phone user's greeting message ends to leave a message and will hang up. A phone user may still wish to know the identity of the caller who hung up. Alternatively, the caller may simply not leave enough information in the caller's voice mail message for the phone user to identify the caller, and the phone user will then have little way of identifying the caller and returning a call to the caller. Furthermore, if the phone user is accessing the VMS from outside the local calling area, the user may incur long distance charges.

Switched telephone networks also may provide information about callers to a phone user. For example, a Visual Call Display (or simply Call Display) can be provided by Advanced Intelligent Networks (AIN), i.e., switched telephone networks with advanced services. The phone user may subscribe to a Call Display service, where the phone user can identify callers who have left messages on the user's phone by means of a display on the phone. In this case, the user does not remotely identify the callers, but must instead return to the location of the phone itself to retrieve information on the identity of the caller. However, it is often inconvenient for a phone user to return to his home or office to determine who has called.

SUMMARY OF THE INVENTION

It would be desirable to provide a method and system for caller identification, where a subscriber would be able to access information about a caller even if the caller hung up before leaving a voice mail message. It would further be desirable to provide a method and system for accessing the caller identifying information remotely, so that a subscriber may access the information from a remote phone or via the internet, and need not be at the subscriber's phone to access the caller identifying information. It would also be desirable to provide a method and system for caller identification, where a subscriber would not incur long distance charges when accessing information about a caller.

According to an embodiment of the invention, a data logging unit within a switched telephone network is provided. A subscriber phone is connected to the switched telephone network which contains the data logging unit. When a call is made to the subscriber phone, the data logging unit stores caller identifying information about the call. A subscriber may retrieve the caller identifying information from the data logging unit by accessing the data logging unit via a network such as the internet or via a remote phone. Because the caller identifying information is logged upon a call to the subscriber phone, the information is logged even if the caller subsequently hangs up before leaving a message on voice mail, or if the caller receives a busy signal. Also, the subscriber may retrieve the caller identifying information remotely without being near the subscriber phone. If the caller identifying information is retrieved via the internet, long distance charges may be avoided. The data logging unit may be implemented in a number of ways, including providing a data base local to a Service Signaling Point, in a Service Control Point, or in stand alone Customer Premises Equipment.

A method of accessing the caller identification information which has been logged with a caller identifying information retrieval service is also provided. The method includes accessing the service via the internet, and then inputting a password to gain access to the information.

A method is also provided for allowing a subscriber access to the caller identifying information. A call is received via the internet, such as for example, a hit on a homepage of the service. The caller is then prompted for a password and the caller is allowed access to the information if a valid password is input. In one embodiment the caller may then review, edit, or save the information through a menu or menus.

A method is also provided allowing a subscriber to retrieve voice mail messages over the internet after the subscriber has accessed caller identifying information via the internet. The caller identifying information includes an indication of whether a caller has received voice mail messages. A method is also provided which allows the subscriber to call back a caller via the internet after the subscriber has viewed caller identifying information.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

The caller identifying information retrieval service and remote caller identification system as further detailed infra will be composed of two aspects, incoming call logging, and retrieval of the logged calls. The incoming call logging aspect of the service entails storing caller information for callers calling a service subscriber's phone, while retrieval of the logged calls aspect entails a system for allowing the subscriber to gain access to the information. Various implementations of the call logging aspect of the service may be combined with the various implementations of the retrieval of the logged calls in a variety of ways. Various implementations of call logging may be combined, and various implementations of the retrieval of the logged calls may be combined in order to provide the subscriber with maximum flexibility in retrieving caller identifying information. Below, different embodiments of a remote caller identification system are described.

Those of ordinary skill will recognize that the remote caller identification system according to the invention could be implemented in the embodiments separately from a subscriber's VMS, in which case the subscriber could retrieve actual messages from the VMS. Alternatively, the caller identification system according to the invention can be implemented as part of a VMS.

Figure 1:
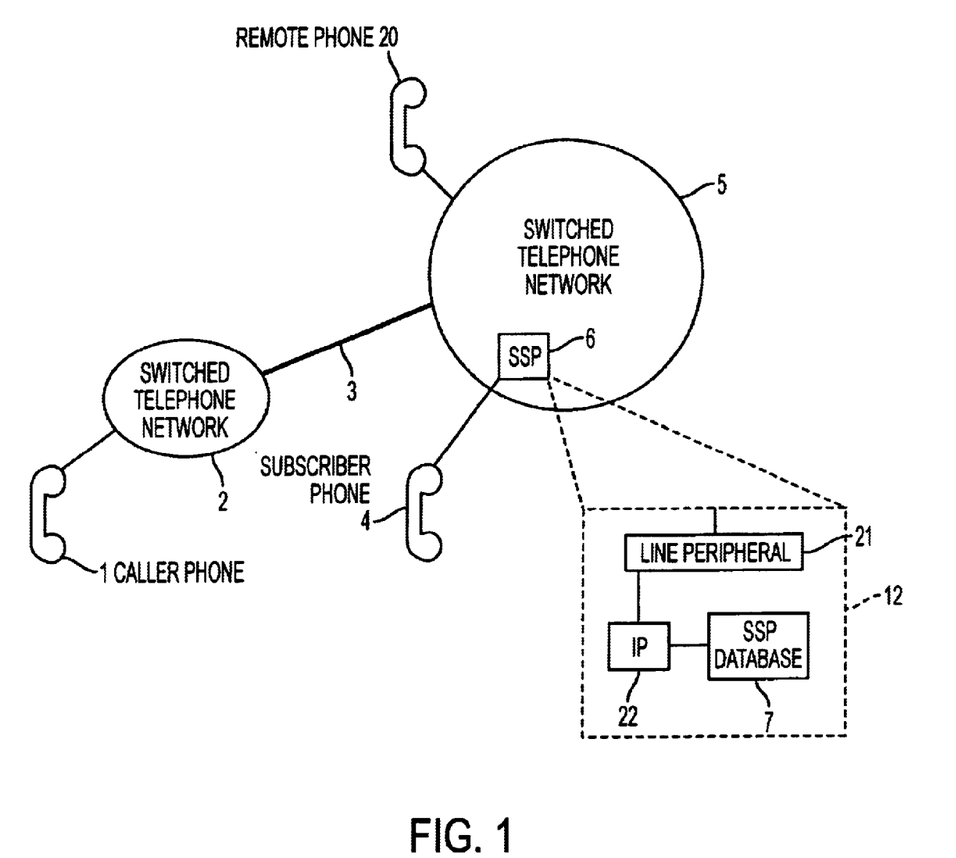
FIG. 1 is a layout of an embodiment of the invention showing a remote caller identification system with a Service Signaling Point (SSP) based logging and remote phone retrieval.

FIG. 1 is a layout of an embodiment of the invention showing a remote caller identification system with a Service Signaling Point (SSP) based logging and remote phone retrieval. A caller makes a phone call from a caller phone 1 to a subscriber phone 4. The caller phone is connected to a caller switched telephone network 2 such as a Public Switched Telephone Network. Caller identifying information relating to the call from the caller phone 1 is then identified upon the call to the subscriber phone. This means that the caller identifying information is logged when the call is initiated by the caller whether or not the caller successfully completes the call. In this invention the caller identifying information may be identified upon the caller calling the subscriber phone, even if the caller receives a busy signal, or if the caller reaches a Voice Mail System (VMS), but hangs up before leaving a message on the VMS. Caller identifying information typically includes the phone number of the incoming call, and other information associated with the incoming call, such as the name of the person with the phone number of the caller phone 1, and the date and time of the call.

The caller identification information may be of the type associated with a caller identification service or caller ID service which is typically provided by a switched telephone network. In that regard, the user of this system may need to subscribe to the caller identification service to be allowed access to the caller identifying information.

The caller identification information is transferred to a subscriber switched telephone network 5 via line 3. Line 3 can be any interconnection medium capable of conveying or transmitting caller identifying information. Line 3 may be, for example, a Common Channel Signaling System no. 7 (CCS7) trunk. Alternatively, line 3 may be a wireless link, or a link through networks other than the switched telephone networks 2 and 5. In this first embodiment, the caller identifying information may be logged by storing the caller identifying information in a data logging unit 12 including a Service Signaling Point (SSP) based intelligent database 7 local to the SSP 6. The SSP 6 is within the subscriber switched telephone network 5. An SSP is a switch used within a switched telephone network and is typically the closest switch to the end user. In this case the closest switch to the end user would be the switch closest to the subscriber phone 4. The database 7 of the SSP is physically implemented using a storage medium, for example, a hard disk for data storage.

In FIG. 1, the caller and subscriber switched telephone networks 2 and 5, respectively, are shown as two different switched telephone networks. Of course, if the caller phone 1 and the subscriber phone 4 are connected to the same switched telephone network, the caller identifying information would be logged within the SSP of that same switched telephone network. In that case, of course, there would be no need of transferring caller identifying information between two different switched telephone networks using line 3.

The subscriber may retrieve the caller identifying information simply by calling in via a remote phone 20. For example, the subscriber would call a number for the information retrieval service, which may be a different number from the subscriber's phone number. Alternatively, the subscriber could call the subscriber's phone number and could be given the option of being forwarded to the information retrieval service. The remote phone 20 may physically be the same phone as the caller phone 1 or the subscriber phone. The remote phone is simply the phone from which a subscriber calls to retrieve caller identifying information from the subscriber's caller identifying information retrieval service. Of course, in practice this could physically be the same phone used for the caller phone 1 or the subscriber phone 4, or a different phone.

Once the subscriber has called in and provided a subscriber password via the remote phone 20 to be allowed to gain access to the caller identifying information, the subscriber may retrieve the caller identifying information. In this embodiment, the caller identifying information stored in the SSP database may be accessed via an intelligent peripheral 22 connected to both a line peripheral 21, and the SSP database. The line peripheral 21 is connected to a switch to the switched telephone network. The intelligent peripheral 22 or service node communicates with the SSP database.

Figure 2:
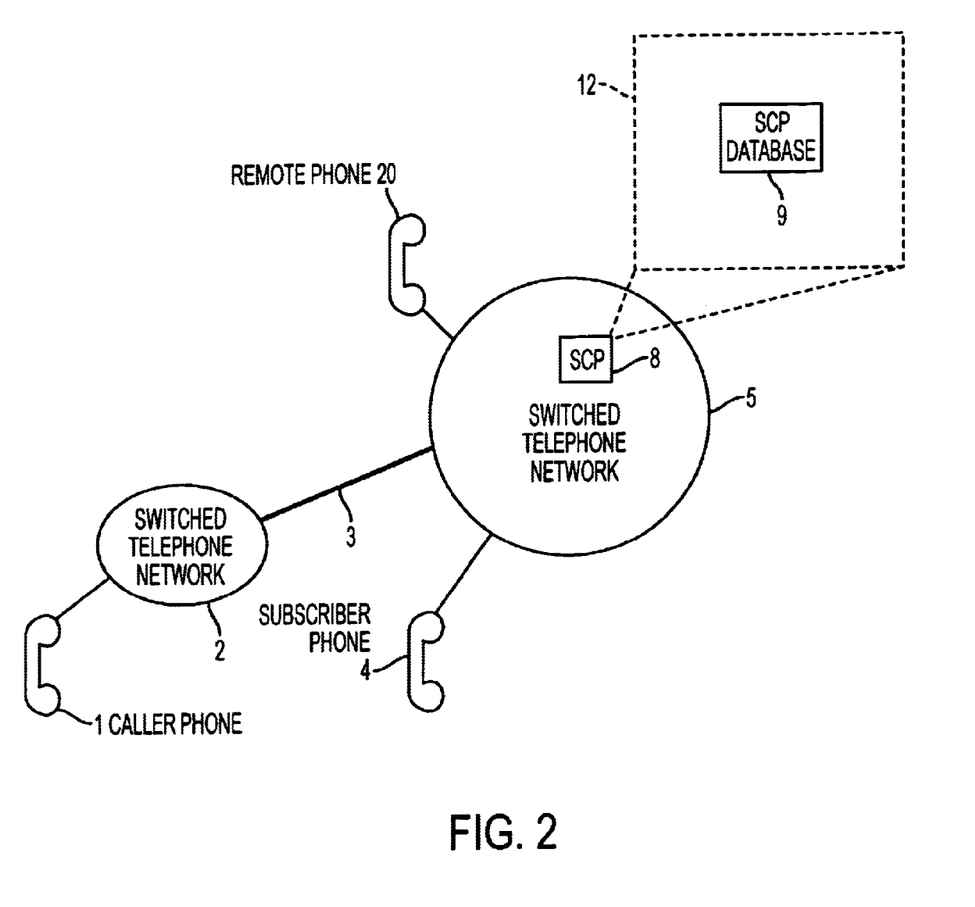
FIG. 2 is a layout of an embodiment of the invention showing a remote caller identification system with a Service Control Point (SCP) based logging and remote phone retrieval.

FIG. 2 is a layout of an embodiment of the invention showing a remote caller identification system with a Service Control Point (SCP) based logging and remote phone retrieval. As with the first embodiment of the invention, in this embodiment a caller makes a phone call from a caller phone 1 to a subscriber phone 4, where the caller phone 1 is connected to a caller switched telephone network 2. Caller identifying information relating to the call from the caller phone 1 is then identified upon the call, and is transferred to a subscriber switched telephone network 5 via line 3. Line 3 may be, for example, a CCS7 trunk, wireless link or link through other switched telephone networks as in the first embodiment.

In this second embodiment the caller identifying information is logged in a data logging unit 12 including a Service Control Point (SCP) based intelligent database 9 in the SCP 8. An SCP is a type of switch which contains a database, which in an Advanced Intelligent Network (AIN), provides services to the SSPs, such as Call Display. The database of the SCP of this invention may be physically implemented using a storage medium, for example, a hard disk for data storage.

As with the first embodiment, the subscriber may retrieve caller identifying information simply by calling in via a remote phone 20. For example, the subscriber would call a number for the caller identifying information retrieval service to access the caller identifying data. Also in a similar fashion to the first embodiment, once the subscriber has called the information retrieval service, and provided a subscriber password via the remote phone 20 to be allowed to gain access to the caller identifying information, the subscriber may retrieve the caller identifying information. In this second embodiment, the caller identifying information stored in the SCP database may be accessed, for example, via an AIN interface to the SCP database.

Figure 3A:
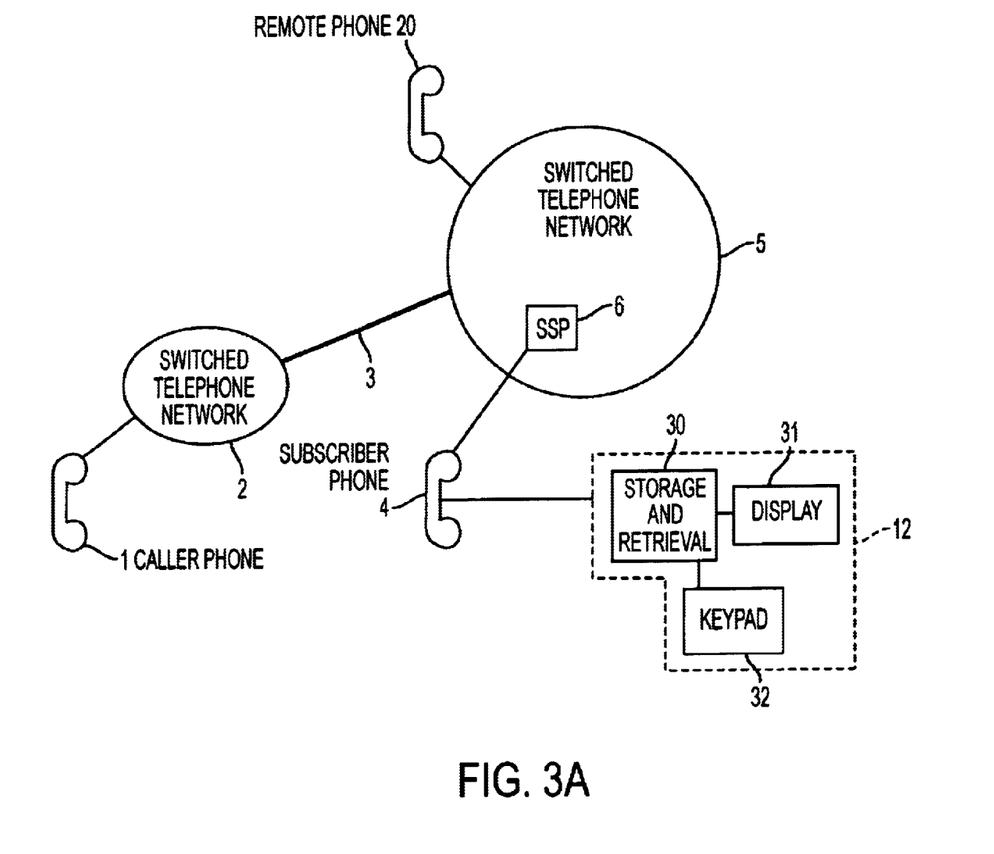
FIG. 3A is a layout of an embodiment of the invention showing a remote caller identification system with a stand alone customer premises equipment (CPE) based logging and remote phone or CPE based retrieval.

FIG. 3A is a layout of an embodiment of the invention showing a remote caller identification system with a stand alone customer premises equipment (CPE) based logging and remote phone or CPE based retrieval. As with the first two embodiments, in this third embodiment a caller makes a phone call from a caller phone 1 to a subscriber phone 4. Also, as with the previous embodiments, the caller phone is connected to a caller switched telephone network 2, such as a Public Switched Telephone Network. Caller identifying information relating to the call from the caller phone 1 is then identified upon the call, as with the previous embodiments. The caller identification information is transferred to a subscriber switched telephone network 5 via line 3. Line 3 may be, for example, a CCS7 trunk, wireless link or link through other switched telephone networks as in the first and second embodiments.

In this embodiment the caller identifying information is logged by storing the information in a data logging unit 12 including an information storage and retrieval device 30 connected directly to the subscriber phone as shown in FIG. 3A. For example, the information storage and retrieval device 30 may contain a storage medium, for example, hard disk or dynamic random access memory (DRAM) for storing the information. The subscriber may then retrieve the caller identifying information by calling from a remote phone 20 to the subscriber switched telephone network 5 as shown in FIG. 3A. For example, the subscriber could call his own phone.

The information storage and retrieval device 30 may also be connected to a display device 31 which would allow the subscriber to display his messages using the display device. The display device would include, for example, a liquid crystal display (LCD) display for display of the caller identifying information. The information storage and retrieval device may also be connected to a keypad 32 for inputting call retrieval requests. Of course, using the display device 31 and keypad 32 located near the information storage display would not be remote retrieval of the caller identifier information, but could be a useful option for the subscriber. In this embodiment, a subscriber would access the caller identifying information in the data logging unit, and display the caller identifying information on the display device.

Figure 3B:
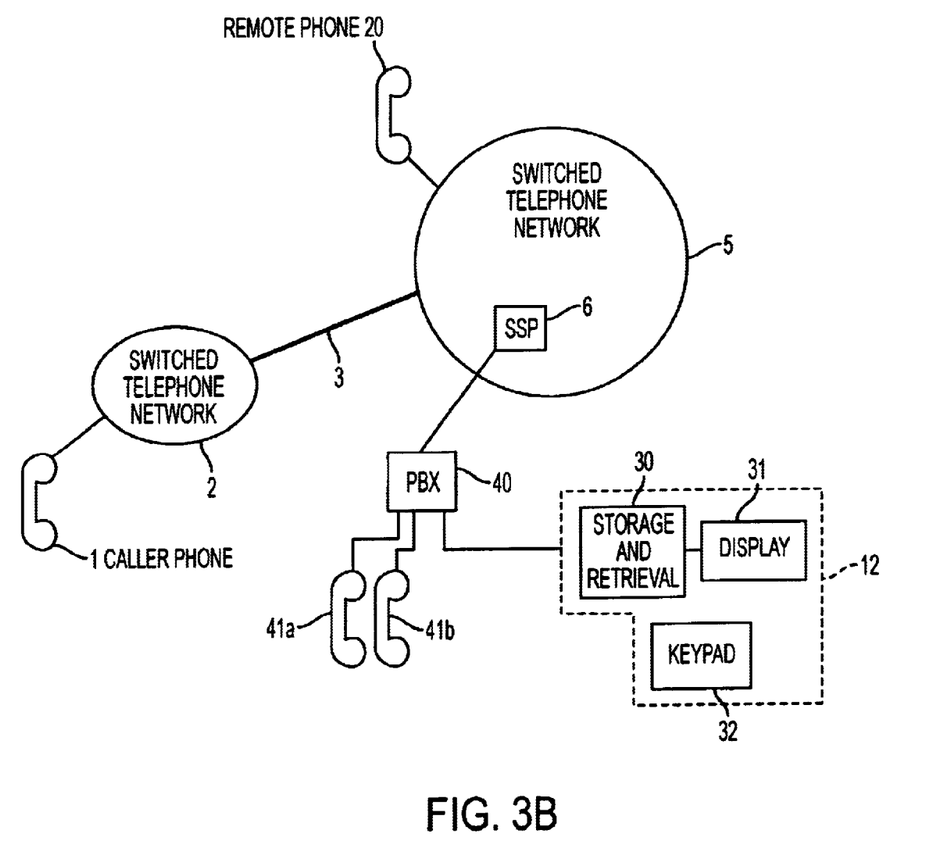
FIG. 3B is a layout of an embodiment of the invention showing a remote caller identification system with a stand alone customer premises equipment (CPE) based logging and remote phone or CPE based retrieval for a CBX based implementation.

FIG. 3B is another implementation of the third embodiment. In this implementation, however, subscriber phones 41a and 41b are connected to the SSP via a Private Branch Exchange (PBX) 40. A data logging unit 12, similar to that of the implementation of FIG. 3A, is connected to the PBX for logging calls to the subscriber phones 41a and 41b. A subscriber may retrieve caller identifying information directly from the data logging unit using the keypad and display, for example. Alternatively, the subscriber may call into the PBX to retrieve caller identifying information.

The first through third embodiments detail retrieving caller identifying information via a remote phone 20. This invention is not limited to retrieval via a telephone. A subscriber may retrieve the caller identifying information via any telephonic device. Telephonic device means a device which may access the identifying information retrieval service. For example, the telephonic device may resemble a pager more than a telephone.

Figure 4:
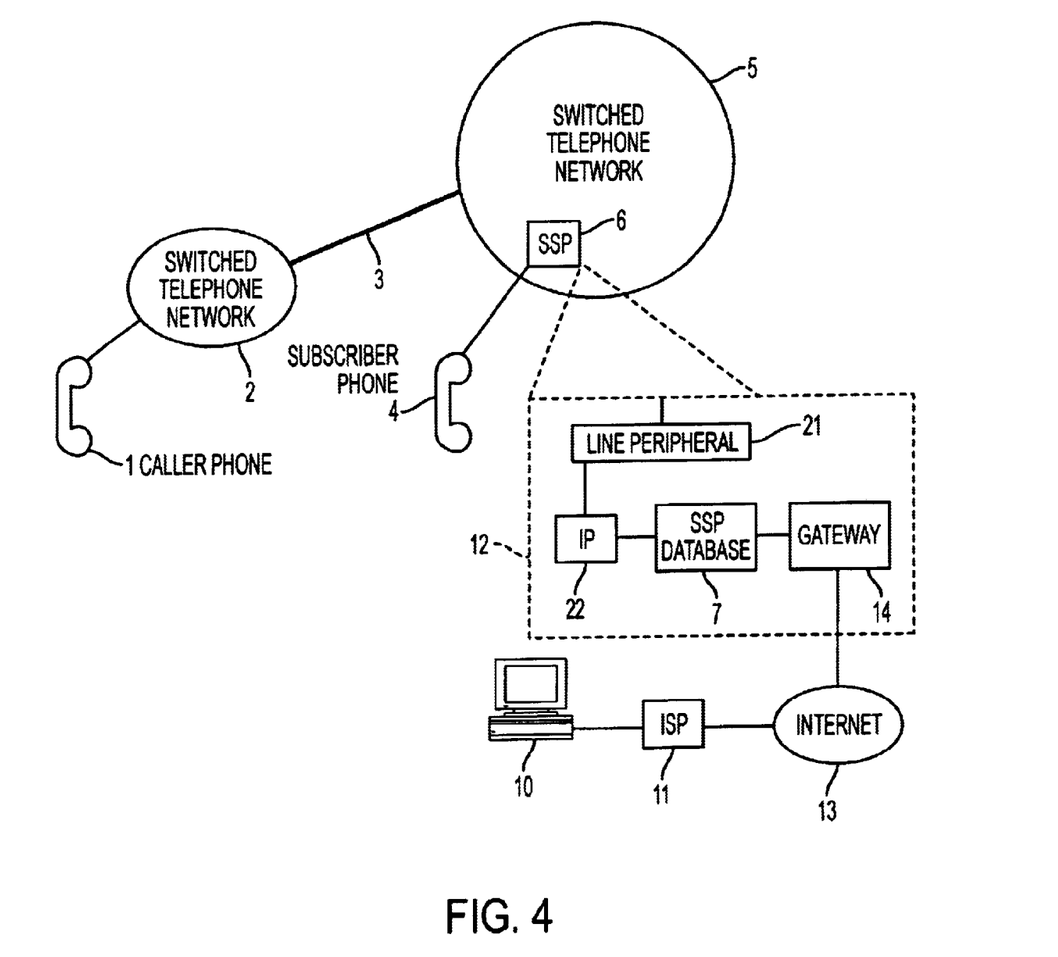
FIG. 4 is a layout of a fourth embodiment of the invention showing a remote caller identification system with SSP based logging and internet based retrieval.

FIG. 4 is a layout of a fourth embodiment of the invention showing a remote caller identification system with SSP based logging and internet based retrieval. A caller makes a phone call from a caller phone 1 to a subscriber phone 4. The caller phone 1 is connected to a caller switched telephone network 2, and the caller identifying information is identified upon the call as in the earlier embodiments. The caller identifying information includes the phone number of the incoming call, and other information associated with the incoming call, such as the name of the person with the phone number, and the date and time of the call. The caller identifying information is transferred to a subscriber switched telephone network 5 via line 3 as in the earlier embodiments.

The caller identifying information of the incoming call may be logged in a similar fashion to the first embodiment, i.e., by storing the caller identifying information in a data logging unit 12 including a SSP based intelligent database 7 local to the SSP 6.

However, in this embodiment, the method of retrieving the caller identifying information differs from the method in the first embodiment. In this embodiment the subscriber may retrieve the caller identifying information via the internet 13. The subscriber uses a computer 10 to access the internet 13 via an Internet Service Provider (ISP) 11. In that regard the subscriber may need a subscription to have access to the ISP 11. Once the subscriber has accessed the ISP 11, and is on-line, the subscriber then may access the caller identifying information through the internet 13 by means of a gateway 14 connected to the SSP data base 7 and the internet 13. The gateway could be implemented, for example, using an intelligent peripheral.

Figure 5:
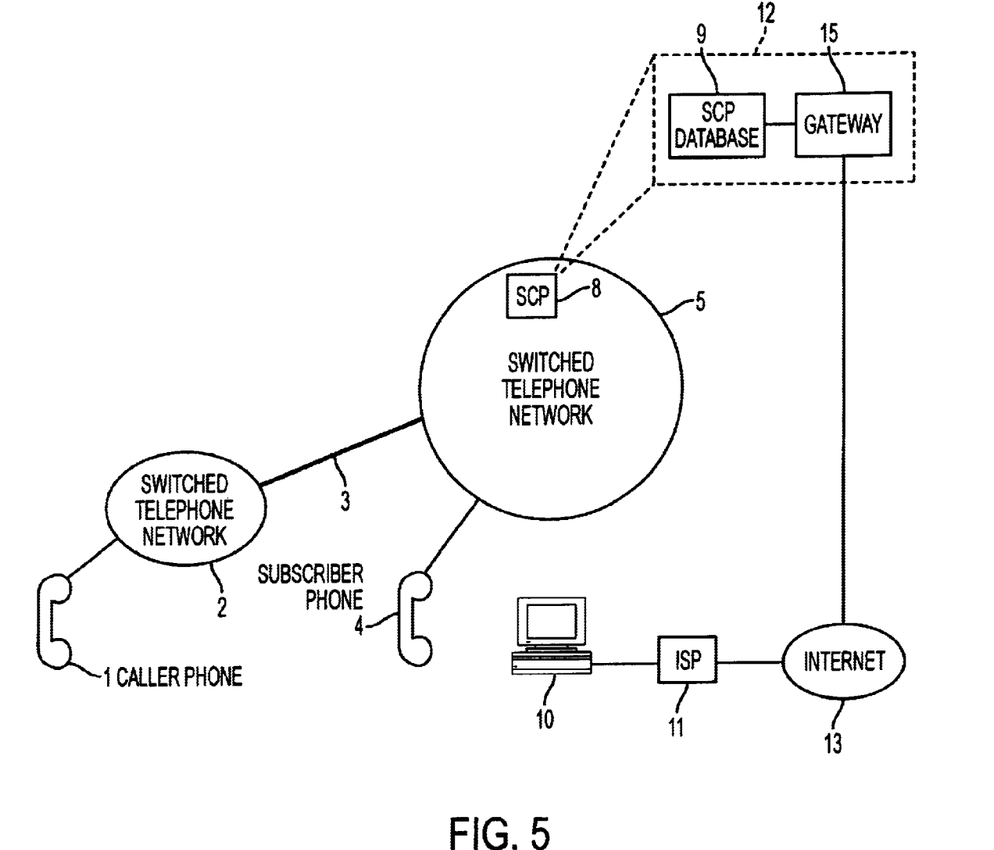
FIG. 5 is a layout of a fifth embodiment of the invention showing a remote caller identification system with SCP based logging and internet based retrieval.

FIG. 5 is a layout of a fifth embodiment of the invention showing a remote caller identification system with SCP based logging and internet based retrieval. A caller makes a phone call from a caller phone 1 to a subscriber phone 4. The caller phone 1 is connected to a caller switched telephone network 2, and the caller identifying information is identified upon the call as in the earlier embodiments. The caller identifying information includes the phone number of the incoming call, and other information associated with the incoming call, such as the name of the person with the phone number, and the date and time of the call. The caller identifying information is transferred to a subscriber switched telephone network 5 via line 3 as in the earlier embodiments.

The caller identifying information of the incoming call may be logged in a similar fashion to the second embodiment, i.e., by storing the caller identifying information in a data logging unit 12 including a SCP based intelligent database 9 in the SCP 8.

However, in this embodiment, the method of retrieving the caller identifying information differs from the method in the first embodiment. In this embodiment the subscriber may retrieve the caller identifying information via the internet 13. The subscriber uses a computer 10 to access the internet 13 via an Internet Service Provider (ISP) 11. Once the subscriber has accessed the ISP 11, and is on-line, the subscriber then may access the caller identifying information through the internet 13 by means of a gateway 15 connected to both the SCP database 9 and the internet. The gateway could be implemented, for example, using an intelligent peripheral. For example, the SCP database may be a AIN SCP database, and the SCP database may be accessed using a standard AIN interface to the SCP.

The fourth and fifth embodiments detail accessing the caller identifying information via the internet. However, the logging of the caller identifying information in the fourth and fifth embodiments are essentially the same as that for the first and second embodiments, respectively. Therefore, the remote caller identification systems of the first and fourth embodiments can be combined, and the caller identifying information may be accessed via either the internet or via a remote phone. Likewise, the caller identifying information systems of the second and fifth embodiments may be combined.

FIGS. 4 and 5 detail embodiments where caller identifying information is retrieved via the internet. However, these embodiments are not limited to retrieving the caller identifying information via an internet network. Alternatively, the caller identifying information may be retrieved via an intranet network.

A typical use of the remote caller identification system may proceed as follows. The subscriber calls into the caller identifying information retrieval service. This may be done either via computer, as in the fourth and fifth embodiments, or via a remote phone as in the first, second, and third embodiments. In the case of accessing the caller identifying information via the computer in the fourth and fifth embodiments, "calling" the information retrieval service may mean accessing an appropriate Universal Resource Locator (URL) via the internet using, for example, a web browser. In the case of accessing the caller identifying information using the stand alone CPE caller identification system of the third embodiment, the subscriber would call the subscribers home or business phone, where the information storage device 30 was attached to the phone. In the case of accessing the caller identifying information using the SSP and SCP based retrieval systems of the first and second embodiments using a remote phone, the subscriber would, for example, call a number for the caller identifying information retrieval service.

Upon successfully calling the information retrieval service, the subscriber will receive a greeting to alert the subscriber of the success in reaching the information retrieval service. For example, for access via the internet, the greeting might be on the homepage of the caller identifying information retrieval service. For access by remote phone the greeting would be, for example, a welcoming voice message alerting the subscriber that the subscriber had accessed the caller identifying information retrieval service.

Following the greeting, the subscriber would be prompted to input a subscriber identification. The subscriber identification may be, for example, the subscriber's telephone number, or name, or some other identification. The subscriber would also be prompted to input a password to ensure security. The subscriber would then input the subscriber identification and password. For access via a remote phone, the subscriber would use, for example, a touch tone phone to input the identification and password. Alternatively to a touch tone phone, the subscriber could use any phone allowing the subscriber to input the identification and password. For access via computer, the subscriber would use, for example, a computer keyboard to input the identification and password.

Alternatively, the identification and password might by the same. In that case, the subscriber need only input the one password/identification to be allowed to gain access to the caller identifying information. For example, for the standalone CPE based logging and retrieval system, only a password would be typically needed.

The subscriber password or password and identification would then be checked for validity. If valid, the subscriber would then be successfully logged into the subscriber service and allowed access to caller identification information corresponding to the valid password or valid password and identification.

Once the subscriber has successfully logged into the subscriber service, the subscriber will be prompted with a greeting message indicating a successful login. The greeting message will also notify the subscriber of the existence of the number of new calls (if any) and calls which are not new (if any). Here new calls means calls which have not been previously retrieved or edited by the subscriber in a prior login. In the case of access via a remote phone the message may be a voice message. For example, the message might be "YOU HAVE NO NEW CALLS", or "YOU HAVE FOUR NEW CALLS" or "YOU HAVE NO CALLS".

The message "YOU HAVE NO NEW CALLS" would be given if the subscriber had no new calls, but did have calls which the subscriber had edited or reviewed on a previous login. The message "YOU HAVE NO CALLS" would be given in the instance that the list of callers is empty.

The message reporting the calls received would then be followed by a menu of commands allowing the subscriber the option of reviewing or editing the caller identifying information associated with each call. For example, if the subscriber had both new calls and old calls, i.e. calls which are not new, the message could be "PRESS '1' TO REVIEW NEW CALLS, '2' TO REVIEW OLD CALLS."

If the subscriber pressed "1" on the remote phone in response to the previous menu message, then a further menu message may be voiced detailing the caller identifying information for the first new call, for example: "FIRST NEW CALL FROM JOHN SMITH AT 1111111 RECEIVED ON MONDAY, FEBRUARY 15, 1999, 3:45 PM". The subscriber may then receive further menu messages, for example messages allowing the subscriber to review other or the same message or to exit the service. The subscriber could thus scroll back and forth between the messages detailing the caller identifying information. The subscriber would be prompted with the following message, for example: " PRESS '*' TO REPEAT, '#' TO GO TO THE NEXT MESSAGE, '1' TO GO TO PREVIOUS MESSAGE, '2' TO REVIEW OLD CALLS, '3' TO EXIT".

If the subscriber then pressed the '#' sign the subscriber might hear the following message "SECOND NEW CALL FROM BOB JONES AT 1111112 RECEIVED ON MONDAY, FEBRUARY 15, 1999, 4:12 PM", followed by "PRESS '*' TO REPEAT, '#' TO GO TO THE NEXT MESSAGE, '1' TO GO TO PREVIOUS MESSAGE, '2' TO REVIEW OLD CALLS, '3' TO EXIT". At the end of the new caller identification menu, the subscriber is given the option to review the old calls in a manner similar to that for reviewing the new calls.

The voice menu may also include options for editing the caller identifying information. Specifically, the subscriber may be given the option of deleting or recalling caller identifying information for prior calls. For example, the subscriber might be prompted with the message: "PRESS '1' TO DELETE CALLS, PRESS '2' TO RECALL SAVED CALLS". Further messages would prompt the subscriber to specify messages to be deleted or recalled.

The caller identifying information may also include an indication of whether the caller phone number was blocked or unavailable. In the case of a blocked call, the caller identifying information message may be, for example, "FIRST NEW CALL FROM PRIVATE NAME RECEIVED ON MONDAY, FEBRUARY 15, 1999, 3:45 PM". In the case of a call where the number is unavailable, the caller identifying information message may be, for example, "FIRST NEW CALL FROM UNKNOWN NAME RECEIVED ON MONDAY, FEBRUARY 15, 1999, 3:45 PM".

If the subscriber successfully logs into the subscriber service via computer and internet by entering a valid subscriber identification and password, the homepage of the subscriber service would prompt the subscriber with a message indicating the number of calls, if any, that the subscriber has received. The subscriber would then have the option of reviewing and/or editing the caller identifying information associated with the calls received. In the context of using a web browser and the internet to retrieve caller identifying information, editing would entail operations such as saving some or all of the caller identifying information to a hard disk, deleting the saved data, or recalling saved data. Other editing operations may include purging the saved data to clean up the hard disk on the computer and permanently delete the deleted information.

In the case where a computer is used to access the caller identifying information, the information from more than one call may be reviewed at once. In this sense the embodiment of this invention where a computer is employed to retrieve the caller identifying information may provide the information more quickly to the subscriber, than the embodiment where a subscriber must serially listen to the caller identifying information.

In the internet based retrieval system, the options of reviewing and/or editing the caller identifying information may be implemented through the use of menus, such as for example, pull-down menus or screen menus. Options for the subscriber could be included in a screen menu, for example:

VIEW ALL CALLS
    VIEW NEW CALLS
    VIEW OLD CALLS
EDIT CALLS
    DELETE CALLS
    RECALL CALLS
    SAVE CALLS
    PURGE CALLS If the subscriber chose "SAVE CALLS", the subscriber would be further prompted with, for example, a menu screen such as:

CALL #1, new call
CALL #2, new call
CALL #3, unread call

The subscriber would then chose which call to save, and then would be given the option to save the call identifying information to the hard disk or other information storage device of the computer.

If the subscriber instead chose "VIEW NEW CALLS" from the first menu, the caller identifying information could then be displayed on the computer screen, for example:

CALL #1, CALL FROM JOHN SMITH AT 111-1111
    RECEIVED ON MONDAY, FEBRUARY 15, 1999, 3:45 PM,
    VOICE MAIL? YES
CALL #2, CALL FROM BOB JONES AT 111-1112
    RECEIVED ON MONDAY FEBRUARY 15, 1999, 4:12 PM.
    VOICE MAIL? NO.

The caller identifying information listed here includes an indication of whether or not a caller has left a voice mail message on a Voice Mail System (VMS service). If so, the subscriber could then be given the option of retrieving the voice message over the internet. For example, the subscriber could click on a button on the web browser using a mouse to retrieve the voice mail message.

A subscriber could also be given the option of phoning a caller back via the internet. Again, the subscriber could click on a button on the web browser to call back a caller. This call back service via the internet could be implemented, for example using a voice-over-intelligent peripheral application on the subscribers computer, such as an intelligent phone.

The caller identifying information retrieval service for both the internet retrieval and remote phone retrieval could also provide the subscriber with other options. For instance, the subscriber could be given the option of changing the subscriber password.

The remote phone used for retrieving the caller identifying information may have special features for reviewing or editing caller identifying information. For example, the remote phone may be equipped with a delete button, save button, recall button, and review button for reviewing and editing caller identifying information. The remote phone may also be equipped with a display device such as a liquid crystal display (LCD) for visual display of the caller identifying information and phone command options. In this case, the greeting message and menu of commands from the caller identifying information retrieval service could be in the form of messages on the display instead of voice messages.

The information storage and retrieval device in the stand alone CPE based logging remote caller identification system may be used in conjunction with the use of a Voice Mail System (VMS) service. When the subscriber is trying to remotely retrieve the caller identifying information for callers from a remote phone, and calls the subscriber phone causing the subscriber's phone to ring, the VMS may launch. This could occur, for example, if the VMS service requires only three rings to launch, while the caller identifying information retrieval service requires more than three rings to launch. The launching of the VMS prior to the caller identifying information retrieval service will interrupt the subscribers retrieval of the call identifying information. To prevent this unwanted occurrence, the VMS capabilities are extended to provide the subscriber with the choice of interrupting the VMS greeting message while it is being played. Interrupting the VMS allows control to be transferred back to the caller identifying information retrieval service environment.

This may be implemented in the following way, for example. The VMS is extended to allow the subscriber to enter an access code after the VMS is launched, such as when the VMS greeting is playing. The access code could be, for example, a short acronym identifying the name of the caller identifying information retrieval service. Upon entering the access code the user will automatically be switched to the caller identifying information retrieval service.

Preferably, once the subscriber is finished retrieving caller identifying information from the caller identifying information retrieval service, the subscriber can then switch to the VMS to obtain any voice mail messages from that service. This can be implemented by giving the subscriber the option of switching to the VMS in the voice message menu of the subscriber service. For example, the subscriber may be prompted with the voice menu message, "PRESS FOUR TO TRANSFER TO VOICE MAIL". Upon pressing "4" on the remote phone, the subscriber would be immediately transferred to the VMS, where the subscriber could then review voice mail messages.

This particular feature of the invention, which would allow a subscriber to switch back and forth between the VMS service and the remote caller identification service is useful in that it allows a subscriber to first identify a particular call, and then if the subscriber deems the call to be of sufficient immediate importance, the subscriber may then switch to the VMS service to listen to that call. In this manner, the subscriber may select only those calls which are of high importance if the subscriber has limited time to review voice mail messages.

The call logging aspect of this invention may be implemented in embodiments of the invention using an SSP through, for example, AIN operations. Implementing the call logging using AIN has the advantage that the required AIN operations are widely available for switched telephone network.

For example, the following AIN SSP operations could be used as some of the operations to implement the service:

Termination_Attempt (or Term_Resource_Available)
T_Answer
T_Busy
T_No_Answer
Send_Notification
Temination_Notification
Request_Report BCM_Event
Close
Update
Update_Success
Default Routing to continue call processing in case SCP is unavailable
Send_to_Resource operations Not all of the above operations would necessarily be required for implementation of the call logging. For example, the Termination_Attempt, Term_Resource_Available, T-Busy, T_No_Answer and Send_to_Resource operations would be optional. Specifically, the Send_to_Resource operations may be needed only for switched telephone network based retrieval using an intelligent peripheral. The Term_Resource_Available trigger could be used as an alternative to the Termination_Attempt operation.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention.

The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system comprising:
   a subscriber telephonic device connected to a subscriber switched telephone network; and
   a data logging unit in the subscriber switched telephone network, the data logging unit storing caller identifying information upon a call to the subscriber telephonic device from a caller telephonic device in a caller switched telephone network, the data logging unit being connected to a network allowing a subscriber access to the caller identifying information via the network, wherein the data logging unit comprises a database for storing the caller identifying information, a gateway connected to the internet, and a line peripheral connected to the subscriber switched telephone network, wherein the database is accessible through the gateway via the internet and separately via the subscriber switched telephonic network via the line peripheral.

2. The system of claim 1,
   wherein the subscriber switched telephone network and the caller switched telephone network are the same switched telephone network.

3. The system of claim 1 further comprising:
   a line connecting the subscriber switched telephone network and the caller switched telephone network for transferring the caller identifying information from the caller switched telephone network to the subscriber switched telephone network.

4. The system of claim 3,
   wherein the line is one of a CCS7 trunk and a wireless link.

5. The system of claim 1,
   wherein the database is local to a Service Signal Point of the subscriber switched telephone network.

6. The system of claim 5, wherein the data logging unit comprises:
   an intelligent peripheral connected to the line peripheral, wherein the database is connected to the intelligent peripheral.

7. The system of claim 1, wherein the database comprises a storage medium storing the caller identifying information.

8. The system of claim 1,
   wherein the subscriber may access the caller identifying information via a computer, wherein the computer is connected to an internet service provider, and the internet service provider is connected to the internet.

9. A method comprising:
   accessing a caller identifying information retrieval service via the internet, wherein the caller identifying information retrieval service allows access via the internet and separately via a remote telephonic device, and wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and inputting a password into the caller identifying information retrieval service via the internet, where caller identifying information has been logged with the caller identifying information retrieval service.

10. The method of claim 9, wherein the caller identifying information is accessed via a computer connected to an internet service provider.

11. A method comprising:

receiving a call from a subscriber via the internet;

prompting the subscriber to input a subscriber password to gain access to caller identifying information where the caller identifying information has been logged; and allowing the subscriber access to the caller identifying information if the subscriber inputs a valid subscriber password, wherein the subscriber may access the caller identifying information via the internet and separately via a remote telephonic device, and wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral.

12. The method of claim 11, wherein the data logging unit stores the caller identifying information upon a call to a subscriber phone.

13. The method of claim 12, wherein the data logging unit includes a database for storing the caller identifying information, and wherein the database is local to a Service Signal Point of a switched telephone network.

14. The method of claim 12, further comprising:

prompting the subscriber with a greeting message to alert the subscriber of success in reaching an caller identifying information retrieval service.

15. The method of claim 12, further comprising:

prompting the subscriber with a menu of commands allowing the subscriber to chose to review or edit the caller identifying information.

16. The method of claim 15, wherein the menu of commands is one of a screen menu and a pull down menu.

17. The method of claim 15, wherein the menu of commands includes a command to delete caller identifying information.

18. The method of claim 15, wherein the menu of commands includes a command to save caller identifying information.

19. The method of claim 18, wherein the caller identifying information may be saved on a hard disk.

20. A method comprising:

accessing a caller identifying information retrieval service via the internet, wherein the caller identifying information retrieval service allows access via the internet and separately via a remote telephonic device;

viewing caller identifying information via the caller identifying information retrieval service, where the caller identifying information includes an indication of whether callers have left voice mail messages to a subscriber phone, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and retrieving at least one of the voice mail messages over the internet.

21. A method comprising:

accessing a caller identifying information retrieval service via the internet, wherein the caller identifying information retrieval service allows access via the internet and separately via a remote telephonic device;

viewing caller identifying information from at least one caller via the caller identifying information retrieval service, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and calling back the at least one caller via the internet.

22. An apparatus comprising:

means for accessing a caller identifying information retrieval service via the internet, wherein the caller identifying information retrieval service allows access via the internet and separately via a remote telephonic device;

means for viewing caller identifying information via the caller identifying information retrieval service, where the caller identifying information includes an indication of whether callers have left voice mail messages to a subscriber phone, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and means for retrieving at least one of the voice mail messages over the internet.

23. An apparatus comprising:

means for accessing a caller identifying information retrieval service via the internet, wherein the caller identifying information retrieval service allows access via the internet and separately via a remote telephonic device;

means for viewing caller identifying information from at least one caller via the caller identifying information retrieval service, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and means for calling back the at least one caller via the internet.

24. A system for use with a subscriber telephonic device connected to a subscriber switched telephone network for allowing access to caller identifying information, the system comprising:

a data logging unit in the subscriber switched telephone network, the data logging unit storing caller identifying information upon a call to the subscriber telephonic device from a caller telephonic device in a caller switched telephone network, the data logging unit being connected to a network allowing a subscriber access to the caller identifying information via the network, wherein the data logging unit comprises a database for storing the caller identifying information, a gateway connected to the internet, and a line peripheral connected to the subscriber switched telephone network, wherein the database is accessible through the gateway via the internet and separately via the subscriber switched telephonic network via the line peripheral.

25. The system of claim 24, wherein the subscriber switched telephone network and the caller switched telephone network are the same switched telephone network.

26. The system of claim 24, wherein the data logging unit comprises:

an intelligent peripheral connected to the line peripheral, wherein the database is connected to the intelligent peripheral.

27. The system of claim 24, wherein the subscriber may access the caller identifying information via a computer, wherein the computer is connected to an internet service provider, and the internet service provider is connected to the internet.

28. A method comprising:

accessing a caller identifying information retrieval service via the internet, wherein the caller identifying information retrieval service allows access via the internet and separately via a remote telephonic device, and wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and inputting a password into the caller identifying information retrieval service via the internet, where caller identifying information has been logged with the caller identifying information retrieval service.

29. The method of claim 28, wherein the caller identifying information is accessed via a computer connected to an internet service provider.

30. A method comprising:

receiving a call from a subscriber via the internet;

prompting the subscriber to input a subscriber password to gain access to caller identifying information where the caller identifying information has been logged; and allowing the subscriber access to the caller identifying information if the subscriber inputs a valid subscriber password, wherein the subscriber may access the caller identifying information via the internet and separately via a remote telephonic device, and wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral.

31. The method of claim 30, wherein the data logging unit stores the caller identifying information upon a call to a subscriber phone.

32. The method of claim 31, further comprising:

prompting the subscriber with a greeting message to alert the subscriber of success in reaching an caller identifying information retrieval service.

33. The method of claim 31, further comprising:

prompting the subscriber with a menu of commands allowing the subscriber to chose to review or edit the caller identifying information.

34. A method comprising:

accessing a caller identifying information retrieval service via the internet, wherein the caller identifying information retrieval service allows access via the internet and separately via a remote telephonic device;

viewing caller identifying information via the caller identifying information retrieval service, where the caller identifying information includes an indication of whether callers have left voice mail messages to a subscriber phone, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and retrieving at least one of the voice mail messages over the internet.

35. A method comprising:

accessing a caller identifying information retrieval service via the internet, wherein the caller identifying information retrieval service allows access via the internet and separately via a remote telephonic device;

viewing caller identifying information from at least one caller via the caller identifying information retrieval service, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and calling back the at least one caller via the internet.

36. An apparatus for allowing access to caller identifying information, comprising:

means for accessing a caller identifying information retrieval service via the internet, wherein the caller identifying information retrieval service allows access via the internet and separately via a remote telephonic device;

means for viewing caller identifying information via the caller identifying information retrieval service, where the caller identifying information includes an indication of whether callers have left voice mail messages to a subscriber phone, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and means for retrieving at least one of the voice mail messages over the internet.

37. An apparatus for allowing access to caller identifying information, comprising:

means for accessing a caller identifying information retrieval service via the internet, wherein the caller identifying information retrieval service allows access via the internet and separately via a remote telephonic device;

means for viewing caller identifying information from at least one caller via the caller identifying information retrieval service, wherein the caller identifying information has been logged in a data logging unit within a switched telephone network, the data logging unit comprising a database for storing the caller identifying information, a gateway connected to the internet, and a line peripheral connected to the switched telephone network, wherein the database is accessible through the gateway via the internet and separately via the switched telephonic network via the line peripheral; and means for calling back the at least one caller via the internet.

* * * * *